United States Patent [19]

Del Rosario

[11] Patent Number: 4,538,547
[45] Date of Patent: Sep. 3, 1985

[54] FISHTANK

[76] Inventor: Luis Del Rosario, 5524 San Fernando Rd., Glendale, Calif. 91203

[21] Appl. No.: 592,942

[22] Filed: Mar. 23, 1984

[51] Int. Cl.³ .............................................. A01K 64/00
[52] U.S. Cl. ....................................................... 119/5
[58] Field of Search ........................................... 119/5

[56] References Cited

U.S. PATENT DOCUMENTS 3,244,145  4/1966  Braunhut ................................. 119/5
3,874,336  4/1975  Murphy ................................... 119/5

Primary Examiner—Hugh R. Chamblee
Attorney, Agent, or Firm—John E. Wagner

[57] ABSTRACT

An improved fish tank employing largely opaque walls with a window which may be of a magnifying or non-magnifying type, but provides a center of attention for viewing fish within the tank. The view within the tank presents the appearance of looking into the natural domain of the fish by reason of the opaque surrounding walls. The walls themselves are of flexible material such as vinyl plastic and backed by reinforcement to provide rigidity. The backing on all sides except the window may be finished or covered with attractive material to convert the fish tank into an attractive piece of furniture, for example, a wall divider.

8 Claims, 7 Drawing Figures

U.S. Patent Sep. 3, 1985 Sheet 2 of 2 4,538,547
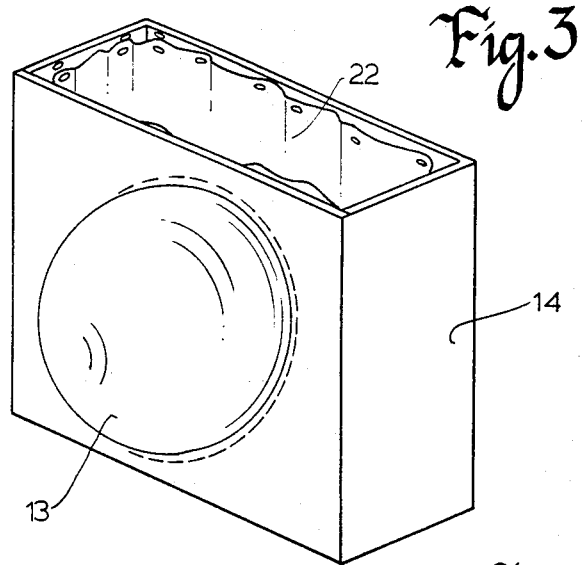
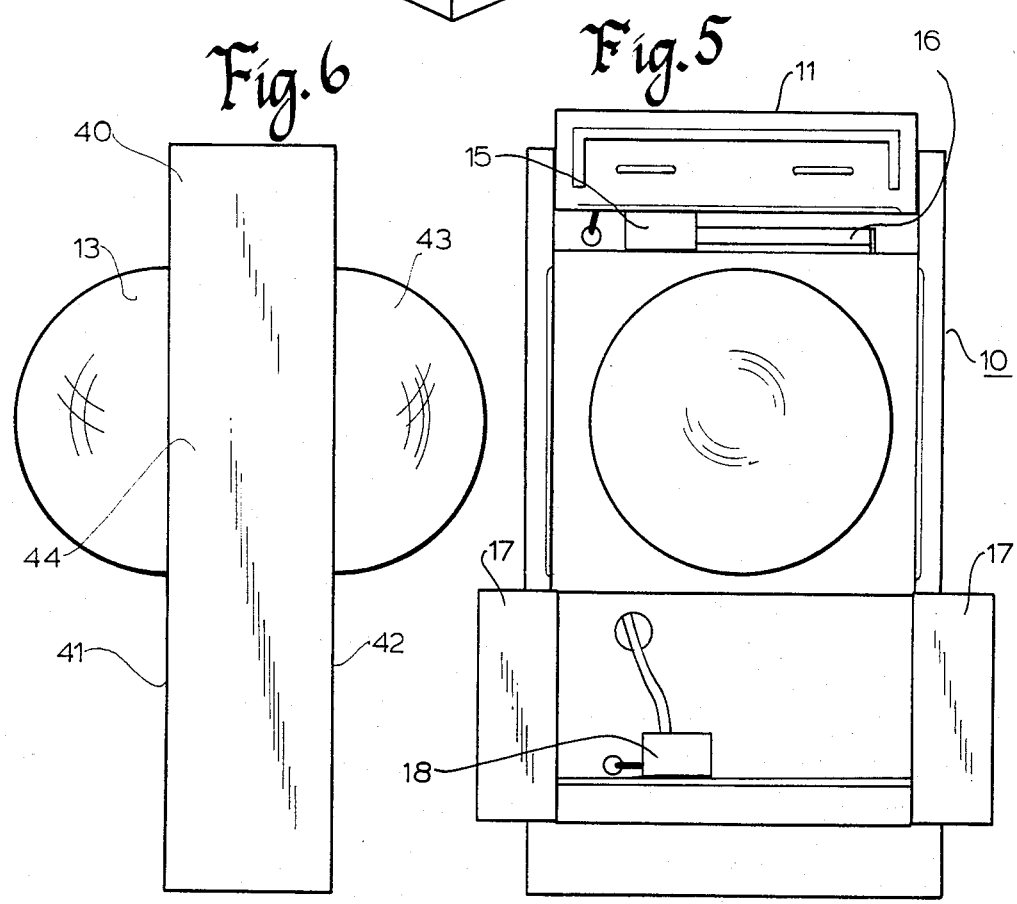

FISHTANK

BACKGROUND OF THE INVENTION

Fish tanks for home or office use have evolved through the years from a small circular fish bowl with a few goldfish to large glass or plastic tanks capable of holding 20 to 50 or more gallons of water. Larger tanks, of course, allow larger fish and more elaborate surroundings. The larger volume of water, however, presents some significant structural problems in that a 50 gallon tank must carry a load of over 300 pounds of water. The walls of glass or plastic must be of sufficient strength to support the load, that is, they must be a quarter inch or more in thickness, adding again to the overall weight. Going to larger fish tanks usually of a rectangular shape, the structure necessary to provide the tank with adequate security against leakage or breakage presents a heavy structure and one which is disproportionally expensive for the function provided.

In addition to the foregoing limitations the large fish tanks, when empty, are difficult to transport and store safely, adding more to their expense.

Attractive as they are, large fish tanks usually present a totally artificial appearance of the fishes environment.

BRIEF DESCRIPTION OF THE INVENTION

Faced with the foregoing state of the art of large fish tanks, I set about to create a tank which presents a large volume of water allowing the keeping of fish up to several inches in length. I set forth to design such a fish tank which allows the owner to provide a more natural appearing environment and one which is low enough in cost so that tanks are available at a reasonable price.

I further set forth to design a fish tank which may be transported and stored in a collapsed condition to take a minimum of space and one which in the event of a leak does not suffer a catastrophic failure, except perhaps for the immediate fish, but may be repaired easily by the owner and returned to service. I also set forth to design a fish tank which itself is an attractive piece of furniture apart from the tank and visual effect of the fish.

I have additionally employed in my fish tank a bubble window which coupled with the design of my tank, provides a magnified view for close study of the fish within the tank against an opaque background which presents a more natural appearance.

My invention resulting from this need comprises a flexible opaque watertight container having a rigid window secured in one wall thereof. The window may be in the order of two feet in diameter, if round, and the tank to hold 50 gallons of water is approximately 40 inches high, 36 inches wide and 11 inches deep from front to back. The size mentioned above is for illustration, but the concept of my invention is applicable to a variety of sizes.

The flexible container is dimensioned to fit within a rigid wall support and has an opening corresponding to the rigid window, whereby the structural support provides for the flexible bag throughout all sides and bottom, and allows view of the fish through the rigid window.

In one embodiment of my invention, the window is circular and flat. In another embodiment, the window is circular and generally hemispherical. In another embodiment of my invention, a vertical support includes windows on both sides which may be either flat or hemispherical. In each of the embodiments, the flexible container is preferably a vinyl bag and has either a neutral dark, blue or black background which tends to give an appearance of a deep continuous mass of water beyond the fish.

BRIEF DESCRIPTION OF THE DRAWINGS

This invention may be more clearly understood from the following detailed description and by reference to the drawings in which:

FIG. 3 is a perspective view of the water tight container portion of this invention;

FIG. 5 is a front elevational view of this invention with doors open; and

FIG. 6 is a side elevational view of an alternate embodiment of this invention.

DETAILED DESCRIPTION OF THE INVENTION

Figure 1:
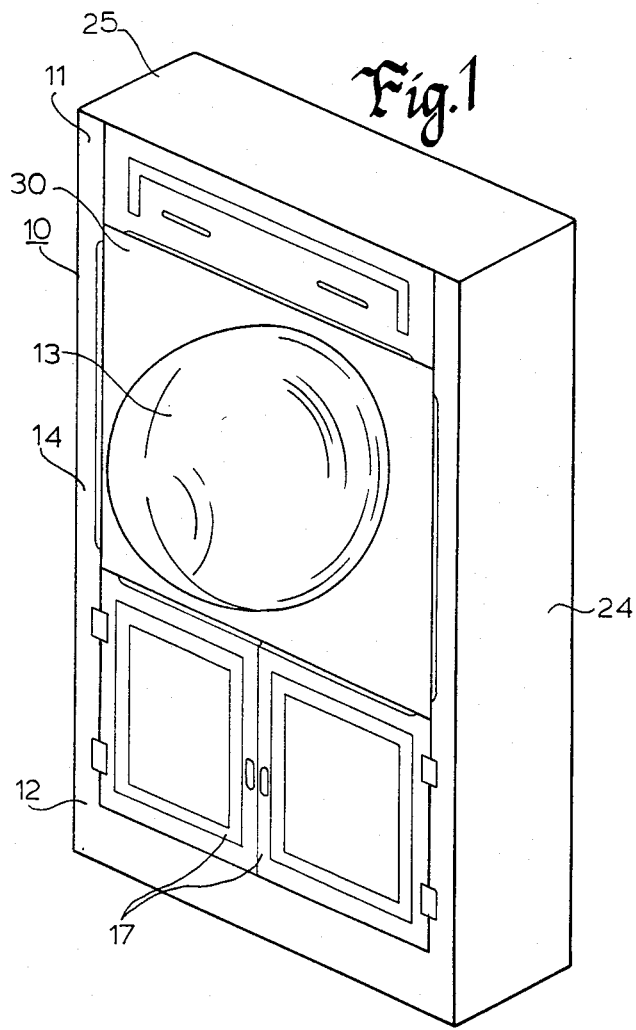
FIG. 1 is a perspective view of an embodiment of this invention.
Figure 2:
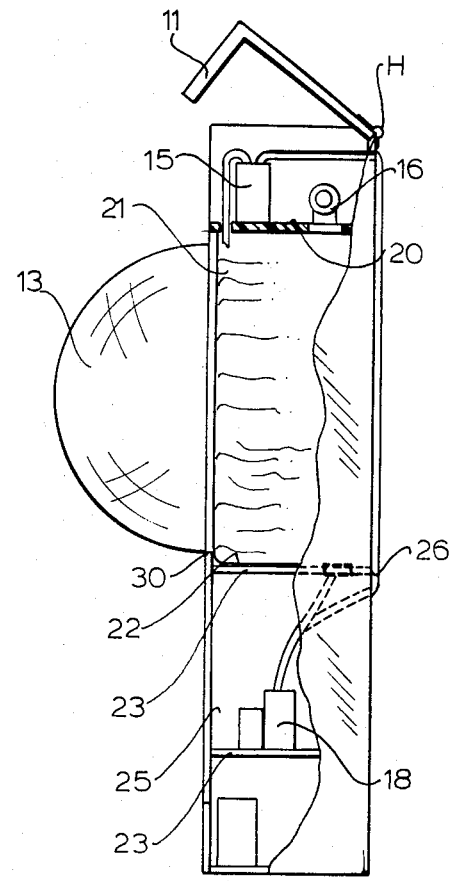
FIG. 2 is a side elevational view thereof with portions broken away to illustrate the details thereof.
Figure 2A:
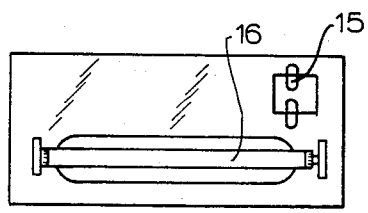
FIG. 2a is a top view of FIG. 2.

Now referring to FIG. 1 in conjunction with FIG. 2 of the drawing, an improved fish tank made in accordance with my invention may be seen. It comprises a cabinet structure 10 of generally rectangular shape and having a width greater than its depth. Typical dimensions are 5 feet in height, 4 feet in width and 1½ feet in depth. An ornamental top region 11 with a base cabinet region 12 frame a central fish tank region 14 with a prominent window 13 which in these figures is shown to be hemispherical. The window 13 is, of course, transparent and formed preferably of acrylic plastic. The window 13 is preferably in the order of 3/16 to ¼ inch in thickness and of optically clear material to provide the best view of the fish contained within the fish tank. The central section 14 of the cabinet structure 10 surrounding the window 13 is preferably opaque and, in fact, a part of the structure which supports the fish tank proper.

As may be seen in FIG. 2, the window is hemispherical and as such, when water filled, constitutes a large magnifying glass which greatly enlarges any fish located directly behind the window when viewed from the front. When viewed from other directions or while close to the window 13 or when the fish are in the hemisphere, the image seen is substantially lifesize allowing a true prespective view of the fish contained within the tank. Although not apparent in the drawing, the interior walls of the tank are preferably dark so that the fish are visible by ambient light or light from above. Ambient light through the window 13 is adequate for the fish to be visible but top lighting with dark walls gives the appearance of an underwater scene with sunlight permeating the water to a limited extent. A very realistic view is obtained without the need for any murals or other artificial attempts to depict underwater scenes. If growing underwater plants are in the fish tank at the bottom, they appear naturally with their roots disappearing below into the darkness.

Figure 4:
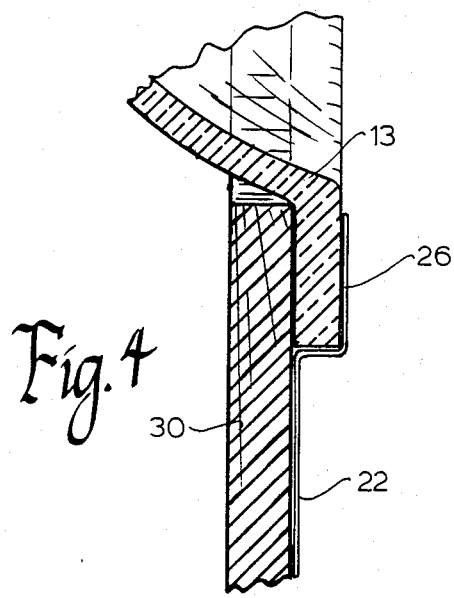
FIG. 4 is an enlarged fragmentary view of the joint between the window and the flexible container.

The details of the cabinet may be more clearly seen in FIG. 2 in which the top section 11 is, in fact, a lid, hinged at H, which extends over the top and front of section 11 to conceal the filter apparatus and optional top lighting. The filter 15 and lamp 16 are supported on shelf 20 which is above the fish tank 21 and includes openings 22 for air and light from the lamp 16 to reach the top of the fish tank 21. The fish tank 21 itself is a flexible bag 22 bonded to the window 13 as is illustrated in FIG. 4 and explained below. The flexible bag 22 is supported by shelf 23 and the side and back walls 24, 25 and 26, respectively, along with the apertured front wall 30.

I have found that ¾ inch plywood forms an ideal material for the cabinet. It provides sufficient strength to support the bag 22 and the window 13 and its contained water as well as a pump 18 of FIG. 2 and filter 15. The bag 22 is preferably 30 mil thick vinyl with heat bonded seams and shaped to conform to the interior of the cabinet 10 in the central region 14. This is illustrated in FIG. 3 with the bag 22 contained within the central cabinet section 14. The dashed line denotes the approximate diameter of a flange 26 of the window 13. The flange 26 is clearly illustrated in FIG. 4. The flange 26 is bonded to the bag 22 by a waterproof cement. Any cement which provides a reliable and waterproof seal between the window 13 flange 26 and the edge region of a cutout in the bag 22 may be used. Water pressure from within the tank aids in applying pressure to compress the seal between the flange 26 and the bag 22. The front panel 30 with a circular matching opening has sufficient strength to hold the front wall as rigid. It provides the reaction force of the water on the seal.

Fig. 5 shows the cabinet 10 of FIG. 1 with the top lid 11 and the cabinet doors 17 open to expose the filter 15 and light 16 above, and pump 18 as well as stored fish equipment and supplies below. When these doors are open, all equipment and supplies are readily available for use in maintaining the fish tank. When closed they add to the ornamental appearance of the entire assembly.

Under certain circumstances, a double sided fish tank is desired. It allows viewing directly through the tank from both sides when hemispherical or convex windows are used as illustrated in FIG. 6. The cabinet 40 of FIG. 6 mounts a pair of hemispherical windows 13 and 43 for viewing of the interior of the fish tank from the opposite faces, namely the front 41 and the rear 42 of the cabinet 40. Ambient light enters the fish tank from both faces and magnification of the images of fish within the central part of the tank 44 occurs. The dashed lines denote the approximate top and bottom of the fish tank. Again, the fish tank proper is a flexible bag supported by the walls of the cabinet.

The windows 13 and 43 may be flat if desired rather than hemspherically shaped as shown in each of the figures when non-magnification of the interior is desired.

The above described embodiments are merely illustrative of this invention and are not to be considered as limiting. Rather, the invention is defined by the following claims including their equivalents.

I claim:

1. A fish tank comprising a rigid self supporting structure including a base and side walls defining the shape of the major volume of a fish tank and having sufficient structural strength to support the volume of water to be contained within the fish tank;

said rigid structure having an opening in at least one of the side walls thereof to define at least one window for viewing fish within the fish tank;

a flexible bag of water impervious material dimensioned generally to fill a space within said rigid structure and with said structure defining a dark background within the tank and providing an appearance of depth;

said flexible bag including a rigid transparent window positioned to correspond with the opening in said rigid structure and extending outward through said window whereby said bag, when within said rigid structure, may be filled with water and is supported by said rigid structure and the interior of said bag may be viewed through said window.

2. The combination in accordance with claim 1 in which said bag is of flexible plastic sheeting material in the order of 1 mil (0.025 mm) or greater in thickness.

3. The combination in accordance with claim 1 wherein said bag is of dark interior color whereby viewing the interior of the fish tank through the window presents a dark background.

4. The combination in accordance with claim 1 in which said bag includes an opening in a sidewall thereof and said rigid window is bonded therein to provide a water impervious bag with a rigid transparent window therein.

5. The combination in accordance with claim 4 wherein said window is of rigid transparent plastic of semi-circular convex shape whereby said window and the water therein provide magnification of the view of the fish within the tank interior.

6. The combination in accordance with claim 5 wherein said window is convex and extends outward from said rigid structure sufficiently that fish within the tank may enter the window region as well as swim in the portion of the fish tank defined by said bag.

7. The combination in accordance with claim 1 wherein said rigid structure includes a pair of openings in opposite walls thereof and said bag includes corresponding windows therein whereby said fish tank includes a direct view through a portion thereof.

8. The combination in accordance with claim 7 wherein said windows diverge outward to provide a larger volume within said fish tank in the window region thereof.

* * * * *